US007703977B2

(12) United States Patent
Knishevitskiy

(10) Patent No.: US 7,703,977 B2
(45) Date of Patent: Apr. 27, 2010

(54) ASEPTIC THERMOMETER STORAGE CASE

(76) Inventor: Anna Knishevitskiy, 1280 E. 18th St., Apt 3-F, Brooklyn, NY (US) 11230

( * ) Notice: Subject to any disclaimer, the term of this patent is extended or adjusted under 35 U.S.C. 154(b) by 240 days.

(21) Appl. No.: 11/690,466

(22) Filed: Mar. 23, 2007

(65) Prior Publication Data

US 2008/0232429 A1   Sep. 25, 2008

(51) Int. Cl.
*G01K 1/08* (2006.01)
(52) U.S. Cl. ............... 374/208; 374/194; 374/209; 374/158; 206/306
(58) Field of Classification Search ............ 206/306, 206/305; 374/194, 208, 209, 158; D10/58, D10/60, 57
See application file for complete search history.

(56) References Cited

U.S. PATENT DOCUMENTS

| 167,327 | A |   | 8/1875  | Gall |
|---|---|---|---|---|
| 343,678 | A |   | 6/1886  | Taturn |
| 921,149 | A |   | 5/1909  | Norwood |
| 1,517,779 | A |   | 12/1924 | Glenn |
| 1,919,811 | A |   | 7/1933  | Stonebraker |
| 1,929,338 | A |   | 10/1933 | Tichenor |
| 2,037,201 | A |   | 4/1936  | Rowntree |
| 2,072,441 | A |   | 3/1937  | Cameron |
| 2,578,587 | A | * | 12/1951 | Palmquist et al. ......... 374/148 |
| 2,645,334 | A |   | 7/1953  | Aldridge |
| 3,010,569 | A |   | 11/1961 | Goldman |
| 3,182,790 | A |   | 5/1965  | Etal |
| 3,341,647 | A |   | 9/1967  | Aberle |
| 3,549,005 | A |   | 12/1970 | Kalogris |
| 3,875,843 | A |   | 4/1975  | Maeda |
| 3,910,410 | A |   | 10/1975 | Shaw |
| 4,013,882 | A |   | 3/1977  | Engler |
| 4,026,751 | A |   | 5/1977  | Fowler et al. |

(Continued)

FOREIGN PATENT DOCUMENTS

JP        11094648 A  *  4/1999
JP       2004045147       12/2004

OTHER PUBLICATIONS

Written Opinion of the International Searching Authority PCT/US 08/57312.

(Continued)

*Primary Examiner*—Lisa M Caputo
*Assistant Examiner*—Mirellys Jagan
(74) *Attorney, Agent, or Firm*—Alexey Bakman, Esq.

(57) ABSTRACT

The invention describes and claims an apparatus and method of maintaining cleanliness of the thermometer storage case. The apparatus is an improved elongated end-loading storage case for thermometers. The improvement comprises two or more elongated sections of the case. Each section comprises a connection edge, an insertion tip, and a distal tip. The elongated sections of the case are detachably connected to each other to form a thermometer storage case that opens up to reveal the inner surface of the case for easy inspection and cleaning. The case comprises a fastener for fixating the case in the assembled case body position. The method of cleaning the thermometer storage case comprises the steps of unfastening and opening the case, inspecting and sanitizing the inside surface of the case, and then reconnecting and fixating the elongated sections to form the thermometer storage case.

20 Claims, 8 Drawing Sheets

U.S. PATENT DOCUMENTS

| | | |
|---|---|---|
| 4,061,226 A | 12/1977 | Essen |
| 4,859,423 A | 8/1989 | Perlman |
| 5,775,488 A | 7/1998 | Vaught |
| 6,142,297 A | 11/2000 | Price |
| 6,169,244 B1 * | 1/2001 | Carlos et al. ............ 136/201 |
| D526,585 S | 8/2006 | Sato et al. |
| 2004/0173476 A1 | 9/2004 | LeTourneau |
| 2005/0236294 A1 | 10/2005 | Herbert et al. |

OTHER PUBLICATIONS

Shelby Davis Worley, Ph.D, "Synthetic Rubber Kills Germs on Contact," Mar. 30, 2000, http://www.sciencedaily.com/releases/2000/03/000329081427.htm, Printed on Apr. 19, 2007.

TailorUSA—Consumer products "#801 new! Weekend Warrior Instant Read Thermometer," http://www.taylorusa.com/consumer/thermo/kitchenth.html, printed on Apr. 19, 2007.

* cited by examiner

ASEPTIC THERMOMETER STORAGE CASE

FIELD OF THE INVENTION

The field of the present invention is thermometer storage cases, and more particularly, a device and method of aseptic thermometer storage for meat, medical, and other types of thermometers.

BACKGROUND OF THE INVENTION

Cooking can be a messy process. Particularly when cooking in large quantities. Particularly when cooking raw meats. Particularly when cooking in a food service setting, where numerous meats are being simultaneously prepared at various states of readiness, and under tremendous time pressures. Cooking can be a messy process. And that is why, according to Centers for Disease Control and Prevention, every year, about 76 million people in the United States become ill from pathogens in food. Of these, up to 5,000 die. That is, every two hours, a person somewhere in the United States dies of food poisoning. The most vulnerable members of our community—elderly, children and people with weakened immune systems, who are dependent on organizational food services of adult homes, schools and hospitals, are at the highest risk of lethal food poisoning. Any new methods or innovations that can reduce this risk and save even a single life, are urgently needed by society and, are quite literally, the matter of life and death.

Some of the worst poisoning cases occur when pathogenic microorganisms that are usually found in raw meats, contaminate prepared foods. A major vector of such contamination is a meat thermometer.

Meat thermometer is a common and frequently used tool that can usually be found in a cylindrical pen-like open-top case, clipped to the pocket of almost every cook and food service worker. Proper food safety procedures and legal responsibilities of food service providers require constant monitoring of the internal temperatures of prepared meats. For example, to ensure that most disease-causing bacteria are destroyed, meats, such as beef and lamb, must be heated to the internal temperature of 145° F. Poultry dishes, stuffings and casseroles must reach internal temperatures of above 165° F. But many dishes can not be overcooked either, and must be removed from heat soon after the safe internal temperature is reached. Thus, a cook must frequently, sometimes every minute or two, insert a thermometer probe into the yet-uncooked meat to monitor the rate of preparation. When not one, but several meats are cooking simultaneously, as is most often the case in food service kitchens, the rate of temperature measurements required of the cook increases dramatically. Frequently, several meats in the kitchen are at different stages of preparation and a single thermometer is used to probe rare and cooked meats.

Whenever in the course of the temperature reading, the probe portion of the thermometer is removed from the uncooked meat, small particles of raw flesh, bodily fluids, and millions of microorganisms remain adhered to the surface of the thermometer. In the ideal kitchen, the ideal food worker would then proceed with carefully washing and sanitizing the thermometer, and then carefully drying the surface before placing the thermometer back into the storage case, clipped to his or her gown pocket. The ideal worker then continues the process of cleaning with the same vigor again and again, each time that the temperature reading is taken. But not every food worker is ideal. And things are often hectic in public service kitchens. In reality, even the most attentive workers, in a hurry, will occasionally put a dirty or casually-wiped thermometer into the case.

Some of the contaminants, such as raw meat particles and bacteria from the surface of the thermometer, will then adhere to the inner walls of the thermometer case, contaminating the case. Even if the meat probed was well cooked-through and free of any living microorganisms, the particles of cooked meat, adhering inside the case, will, within hours, become the rotting breeding ground for millions of bacteria. If the dirty thermometer is inserted into the clean case even once, the case will become forever contaminated. Afterwards, even if the thermometer itself is always properly sanitized after use, it will become re-contaminated again and again after each insertion into the contaminated case. When such a re-contaminated thermometer is taken out of the case to probe prepared foods, the bacteria from the surface of the thermometer remains in the food. This leads to violent illness, deaths, and tremendous legal liabilities.

The problem with standard pen-like pocket-clip thermometer cases available on the market today, is that contamination of the case is impossible to detect. The common design of such a case is a long and very narrow tube. It is nearly impossible for the user to notice any stains or food particles on the dark inner surface of the case.

An even bigger problem is that contamination inside of the standard case, even if noticed, or known, is nearly impossible to clean. Proper cleaning involves at least a good scrubbing and washing of the surface to mechanically remove the decomposing food particles and microorganisms from the surfaces of the case. The surfaces must them be thoroughly and completely dried to prevent the accumulation of moisture, favorable for bacterial and mold growth, inside of the case. However, the narrow confines of the bore allow no access for quick, simple and, most importantly, reliable cleaning and drying of the entire internal surface.

Yet another problem associated with most top-loading thermometer cases is the risk of botulism. Botulism is one of the most lethal food poisoning varieties, resulting from neurotoxins, released by *Clostridium botulinum*. *Clostridium botulinum* is anaerobic bacteria, meaning that it grows best in sealed, low-oxygen environments. Presently, some thermometer cases are completely sealed, aside from the insertion aperture, while others also have an aperture on the distal end. However, when the thermometer is inserted into the casing, the distal end aperture becomes tightly plugged-in by thermometer's probe, while the insertion aperture is plugged in by the thermometer's dial or calibration knob. Thus, a sealed-off space is created inside of the case. If the thermometer was not properly sanitized before being placed into the case, or if food particles from prior thermometer insertions remain inside of the case, then, as described above, common types of aerobic bacteria will start growing inside of the case. These bacteria will eventually use up the oxygen in the sealed-off space and allow the lethal neurotoxin-producing anaerobic bacteria, such as *C. botulinum* to grow on and around the thermometer probe. The structure of the present invention solves this problem.

The dangers of contaminated thermometer cases and the accompanying legal liabilities are well known to food service providers. Aside from the moral and business issues of poisoning one's customers, negligence law generally puts a heavy burden of duty on food service providers to continually ensure the safety of their patrons. Breach of this duty can lead to prolonged and expensive litigation and very unfortunate legal outcomes, including imprisonment, fines, and tremendous civil liability. And that is why, instead of using thermometer cases of questionable cleanliness, responsible organizations often choose to discard and repurchase their entire stock of thermometers every few weeks. Quality food thermometers are not cheap, and this approach is obviously an extremely expensive one. Furthermore, such approach does not prevent the contamination of the case and subsequent poisonings within the first several weeks of thermometer use, before it is discarded. Thus, most thermometer purchasers would prefer a possibly more expensive thermometer and storage case, but one that can stay verifiably clean, and be used for a long period of time, without the fear of unexpected and unpredictable poisonings and liability.

Measuring anal temperature is also a messy process. As is measuring oral temperature, armpit temperature, ear temperature, or for that matter temperature on any part of an ill person or animal. Pathogenic bacteria present in body fluids and skin of a person, attach to the surface of the thermometer. When the thermometer is placed into the storage case, the microorganism-infested tissues, including skin flakes and oils contaminate the case in the same way as described above with the meat thermometers. Once the case is contaminated, the thermometer will pick up bacteria from the case each time that it is put in contact with the case. The bacteria will then be transferred to another patient or family member who uses the same thermometer. Since medical thermometers are usually used only when a person feels ill, most thermometer users already have immune systems weakened by a disease. In such a common situation, contaminated thermometer may well be the cause of a secondary infection. Secondary infections are extremely dangerous, and frequently fatal.

Some kinds of bacteria, the most dangerous and very common kinds, can lay dormant for years inside of a thermometer case. Spore-forming forms, such as *Bacillus*, cause the most dangerous and diverse bacterial ailments, including anthrax, meningitis, endocarditis, respiratory, and urinary tract infections, and food poisonings, among others. *Bacillus* spores can survive for hundreds of years, scattered around in a thermometer case without any access to water or nutrition. As soon as the thermometer, infected with these dormant spores contacts the tissues or body fluids of a living organism, the bacterial spores spring to life, rapidly multiplying and infecting the user of the thermometer. Most disinfectants do not work on bacterial spores. The only reliable way to get rid of the spores is to scrub and/or wash them out with hot water and soap. But tubular side-loading cases currently used to store modern medical thermometers (such as the case described in U.S. Pat. No. D526,585) are also generally narrow and do not allow proper access for inspection, cleaning and drying.

Similarly, other types of thermometers, such as those used in scientific laboratory work, or commercial manufacture can become contaminated through storage in a small and convenient, but easily-contaminable, hard-to clean tubular cases. Minute amounts of chemical substances trapped in the storage case and contaminating the thermometer, can have catastrophic effects on the rate and accuracy of chemical reactions and the quality of end products obtained. Thus, cases that are easy to clean and to verify the cleanliness of are necessary for these kinds of thermometers as well.

Until recently, most designs for thermometer protective cases did not directly address the problem of cross-contamination of foods and patients through the use of thermometer. Instead, thermometer cases of the past mostly focused on protecting fragile glass mercury thermometers of the day from external contamination (such as dust) and physical shock. Many were shaped as traditional caskets, with lids. Such cases were generally bulky and, in contrast to the sheath-type cases of the present invention, had to be opened and closed whenever the user had to access the thermometer.

The cases had to protect the thermometer on all sides, and often employed padding to keep the thermometer in place. Such padding often consisted of soft porous materials that, while protecting the thermometer from breakage, greatly exacerbated sanitary concerns. Particles of food in case of food thermometers, or particles of infected flesh, such as skin flakes, in case of medical thermometers, would get caught in the padding material and contribute to continuous re-contamination of the thermometer. The porous nature of the padding material usually made proper cleaning very difficult, if not impossible task.

Newer, commonly-used top-loading sheath-type cases are much smaller, sometimes barely larger than thermometer itself. They offer solid protection for the few sensitive parts of modern thermometers and provide simple insertion and extraction. But cleanliness remains their very serious deficiency. This deficiency in top-loading cases is recognized and several attempts were made to address it.

For example, some patents teach the use of sanitizing medium within the case. In such cases, wiping members may be used to wipe off the thermometer before insertion and to seal the sanitizing medium within the case. However, there are several obvious drawbacks to implementation of such apparatus'. One issue is the use of chemicals to sanitize the utensil, such as a food thermometer, that is used to penetrate prepared foods. Some traces of the sanitizing chemical are always going to remain on thermometer's surface and get transferred into the food. To successfully sanitize the thermometer probe, such chemical must be harmful enough to bacterial cells and other living microorganisms to kill them, or inhibit their growth. Such substances can, and usually are, just as harmful to human cells as they are to bacterial cells. Many disinfectants kill bacteria by altering or damaging DNA, other work by destroying cell walls, yet others interfere with cellular metabolism. The mechanisms of function of many such sanitizing substances are still not fully understood, let alone their effects on humans. Many disinfectants are carcinogenic. At the very least any potent disinfectant will cause allergies in some people, thus making the case troublesome and legally-dangerous for use in food service settings.

Cases holding liquid disinfectant are complex and relatively expensive to make. The sanitizing medium must be regularly replaced, which can be cumbersome and expensive. Cases with sanitizing medium inside, are larger and heavier than standard cases, negating most of the advantages associated with top-loading cases. Wiping members, sometimes used in such cases to contain the fluid and to wipe the thermometer, are prone to deterioration. But even when the wiping members are in good condition, they do not reliably prevent spills of abrasive chemicals into the shirt pocket. Wiping members can also act as contaminant-traps, capturing food particles and bacteria between the layers of wiping members (where the disinfectant is absent). The contaminants are deposited between the layers when the thermometer is inserted into the case. The contaminants caught between the layers then recontaminate the thermometer as it is being taken out of the case.

The problem of case contamination has also been recently addressed by implementation of anti-microbial plastics in the construction of the case. The use of such plastics in top-loading cases of traditional closed-tube design does not solve the most important problems associated with case contamination. It does, however create an additional major problem for users and manufacturers, as discussed below.

Antimicrobial plastics are composed of polymers mixed with special disinfectants. The plastic slowly releases the disinfectant over time, inhibiting bacterial growth on the surface of the plastic. When the disinfectant runs out, the plastic permanently looses its anti-microbial characteristics. In the case of thermometer holders, it is impossible for a cook to determine how much, if any disinfectant is being released from a particular case, and when it completely runs out. The cases, are usually stored under elevated temperatures, be it inside of a pocket or by the stove. Hot thermometers are often inserted into the cases. Wet, dirty thermometers are often inserted into the cases. Thermometers scratch the case walls during every insertion and extraction. All of this causes the disinfectants to release from the case walls at accelerated rates, soon leaving anti-bacterial plastics rather impotent.

Cases made of antimicrobial plastics may initially prevent some microbial growth, but they do not disinfect the thermometer. Thus, proper safety techniques still dictate that the thermometer must be disinfected after every use, before being placed back into the case. If chemical disinfectants are used on the body of the thermometer, traces of these chemicals may react with chemical disinfectants that are being released from the walls of the case. The products of these reactions may be toxic, carcinogenic, or otherwise harmful to human body. Even if no health statistics is yet available on effects of disinfectants used in antimicrobial plastics, some customers may still be reluctant to insert a utensil with traces of chemical disinfectant into their food, and therefore reluctant to buy such a case.

Of even greater importance is the fact that anti-microbial plastics are generally limited in their anti-microbial characteristics. Anti-microbial plastics are not effective against all types of pathogenic microorganisms and will not instantly kill bacteria on contact. Even if the case is new, with still-potent anti-microbial characteristics, some bacteria may well survive for some minutes, hours, or days on the surface of the case, leading to thermometer recontamination within this time.

Some kinds of bacteria, including the most dangerous spore-forming genera of *Bacillus* and *Clostridium*, may survive exposure to disinfectants for years. In fact their spores are not only resistant to chemical disinfectants, but also to ultraviolet and gamma radiation, desiccation, lysozyme, temperature and starvation. As soon as the spores of these bacteria are transferred back into food, they spring to life, contaminating the food, and poisoning the consumer. There need not be a great number of bacterial spores for such contamination to be deadly. Even a single spore of *Clostridium botulinum*, if swallowed, can spring to life, multiply inside the digestive system and kill a person. Young children and people with low acidity in the digestive system are at particularly acute risk. In fact, recent studies have shown that botulism bacteria or toxin were found in up to 20% of cases thought to be caused by Sudden Infant Death Syndrome (the leading cause of death among infants who are 1 month to 1 year old). The only practical way to get rid of these bacterial and protozoan protective spores and cysts in thermometer case is to mechanically scrub and wash them away with soap and water.

If anti-microbial function of the anti-microbial plastics case performs as expected, some bacteria will die, but if the case is not regularly and thoroughly cleaned, the layer of dead bacteria and contaminants will form a protective film on the walls of the case. Antimicrobial plastic generally only affects bacteria in direct contact with the surface of the plastic. Once the protective film forms on the surface of the case, the film will act as a barrier between the new layers of bacterial contamination and the disinfecting substance. The bacteria will flourish inside the case, which will lead to thermometer contamination. In fact, any contaminant more than a few cells thick, such as a particle of meat, will likely not be affected by anti-microbial plastics. There may be inhibition of bacterial growth in place of contact with the case, but bacteria will be thriving inside and on the surface of the meat particle.

Due to the limited effectiveness of anti-microbial cases, health risks arise for consumers, and serious legal risks arise for manufacturers and distributors of such cases. Some consumers will purchase the cases under assumption that the case is 100% effective against all microorganisms on the surface of the case, or that the case will sanitize the thermometer. Some may assume that anti-microbial properties of the case do not expire with time. There is no simple way for consumers to check the case for decay or discoloration inside, and no simple way to clean it, due to the structural deficiencies described above. Thus, many will rely on manufacturer's "anti-microbial" label, assuming that the case is microbe-free until the worst happens. Then, the cook, the victim, or dead victim's representatives will sue the manufacturers and distributors of anti-microbial cases for inducing false reliance, by giving a false and unverifiable sense of security in the safety of their products. If the design of the cases had been such that the case could be opened by the cook, checked for contamination, and washed, if required, then, cooking safety would be greatly increased. Thousands of people each year would be spared from violent illness or death. This by itself would lead to decreased legal liability. But even in cases of improper sanitary technique, where the chef easily could have, but did not inspect or clean the thermometer case, the chef alone would be at fault, and the liability of manufacturers and distributors would be greatly reduced.

In light of the problems and liabilities associated with traditional thermometer cases, there is a long-standing and unsatisfied need in the art for a case that can be maintained verifiably clean, without sacrificing the all-important modern thermometer case conveniences, such as the smallest possible form factor, solid protection of the sensitive thermometer parts, and quick and easy thermometer removal and insertion without any need to open the case. Such a case should retain all its advantages in its basic form, or in conjunction with the latest sanitary advancements, such as anti-microbial plastics. In addition to that, the case should retain extremely low costs of production and ownership. The present invention achieves all of these objectives and provides numerous additional benefits for manufacturers, consumers, and society in general.

SUMMARY OF THE PRESENT INVENTION

The invention describes and claims an apparatus and method of maintaining cleanliness of the thermometer storage case. The case of the present invention comprises a plurality of elongated sections. Said elongated sections of the case are detachably connected to each other along the connection edges to form a thermometer storage case that opens up to reveal the inner surface of the case for easy inspection and cleaning. In some embodiments, microscopic air passages remain between the elongated sections, even when the elongated sections come tightly together at the connection edges, said air passages intended to inhibit the growth of anaerobic bacteria inside the case.

The preferred embodiment comprises two elongated sections. Each of these elongated sections in turn comprises an outer surface, a (preferably concave) inner surface, a connection edge, a thermometer insertion tip of the section, and a distal tip of the section. These elongated sections, in the preferred embodiment, are each connected to at least one other adjacent elongated section. Such connection in the preferred embodiment is achieved by at least one hinge, although the hinge is not necessary in some embodiments. In the preferred embodiment, the hinge is the living hinge, meaning that the hinge itself has no moving parts and bends/flexes to allow movement of the elongated sections in relation to each other. The hinge may also be disassembleable. This means that the hinge can be taken apart into two or more parts, thus allowing for total disconnection of the elongated sections from each other, for inspection and/or cleaning.

The case body further comprises an insertion end of the case body, a distal end of the case body, and an insertion aperture located at the insertion end of the case body. A bore is formed by the inner surfaces of the elongated sections and extends longitudinally through the case body. The bore is shaped to accommodate and securely hold the thermometer.

Case 10 further comprises a fastener. The fastener is capable of fixating the case in the assembled case body position. In the preferred embodiments, the entire thermometer storage case, including the fastener, the elongated sections, and the hinges, is made of a flexible and/or transparent plastic, such as polypropylene.

The invention also claims the method of maintaining cleanliness of the above thermometer storage case. To maintain the cleanliness, the user first unlocks (unfastens) the fastener, and opens or unfolds the case. The user then inspects the inside surface of the case for contamination, and proceeds to sanitize the inside surface of the case. The elongated sections are then reconnected and/or folded towards each other to form the thermometer storage case. The case is then fixated with the fastener in the assembled case body position.

IMPORTANT OBJECTS AND ADVANTAGES

The following important objects and advantages of the present invention are:
1. To provide an aseptic thermometer storage case that allows for simple inspection of the internal cleanliness of the case.
2. To provide a thermometer storage case that allows for easy cleaning and sanitizing of the internal surfaces of the case.
3. To provide an aseptic thermometer storage case that will inspire confidence in food safety.
4. To provide a thermometer storage case that inhibits the growth of anaerobic bacteria, such as the fatal neurotoxin-producing *Clostridium botulinum*.
5. To provide a thermometer storage case that can be kept clean without utilizing any chemicals that may be harmful to human health.
6. To provide an aseptic thermometer storage case that protects the thermometer from physical shock.
7. To provide a thermometer storage case that protects the thermometer from external contaminants.
8. To provide a thermometer storage case that is lightweight.
9. To provide a thermometer storage case that is spill-proof.
10. To provide an aseptic thermometer storage case that retains the fast and easy thermometer removal and insertion characteristics associated with conventional open-top cases.
11. To provide an aseptic thermometer storage case that is simple and inexpensive in production.
12. To provide an aseptic thermometer storage case that can be adapted for use with existent thermometers.
13. To provide an aseptic thermometer storage case that can be used with a broad range of thermometer types, including those utilized in food service, medicine, science, manufacture and other fields.
14. To provide an aseptic thermometer storage case, that will reduce manufacturer's and user's legal liability for food poisoning.
15. To provide an aseptic thermometer storage case, that will save human lives.

DETAILED DESCRIPTION OF THE PREFERRED EMBODIMENTS

Figure 1:
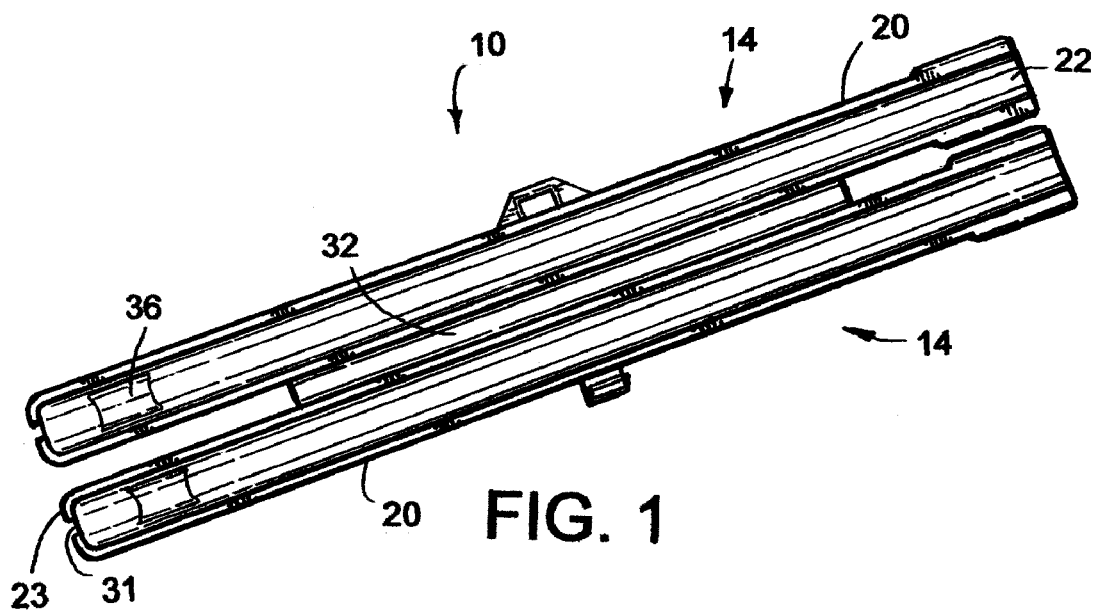
FIG. 1 is a top view of the preferred embodiment of the thermometer storage case of the present invention with disassembled case body and a living hinge connecting two elongated sections.
Figure 2:
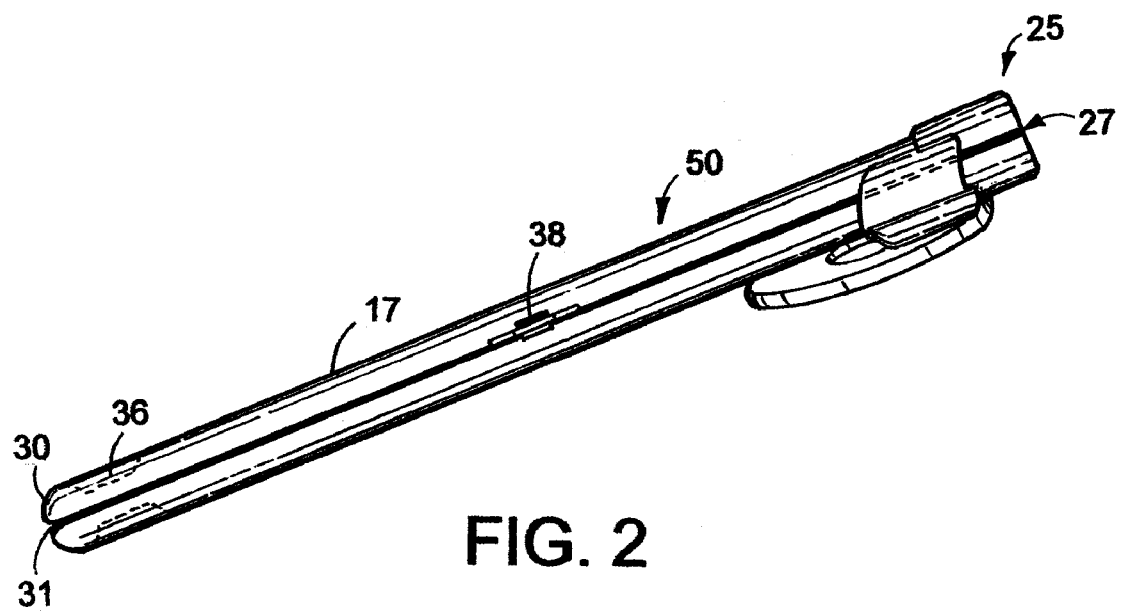
FIG. 2 is a side view of the thermometer storage case of FIG. 1 with assembled case body and a removable pocket clip attached to the insertion end of the case body.

The apparatus of the present invention will now be illustrated by reference to the accompanying drawings. Preferred embodiments of the aseptic thermometer storage case of the present invention have been assigned reference numeral 10. Other elements have been assigned the reference numerals referred to below.

The device of the present invention, also referred to as the case 10 or the device 10, is an elongated end-loading storage case for meat, medical, scientific, and other thermometers. In contrast to traditional thermometer cases of similar design, the case 10 allows for easy inspection and simple cleaning of the internal surfaces. Some embodiments of the device 10 also provide for better air circulation within the case, thus inhibiting the growth of anaerobic bacteria.

To achieve these and other advantages, the device 10 comprises a plurality of elongated sections 14, also referred to as sections 14. These sections, which are in essence the main building blocks of the case, are preferably made of plastic. However, a broad range of materials or combinations of materials may be used. Such materials include, but are not limited to special anti-microbial plastics and resins, wood, metal, and various synthetic materials.

The term "plurality," as used in describing the number of sections 14 refers to two or more sections. The preferred embodiment, portrayed on FIG. 1, comprises only two sections, which fold onto each other in a clamshell fashion. However, as shown on FIG. 3, three or more sections may be used for more efficient cleaning access or for maintaining better air circulation inside of the case 10.

Figure 4:
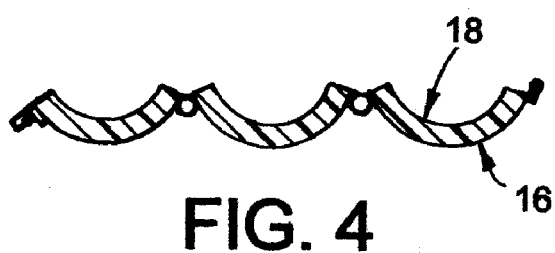
FIG. 4 is a transverse section taken on line 4-4 of the device of FIG. 3
Figure 10:
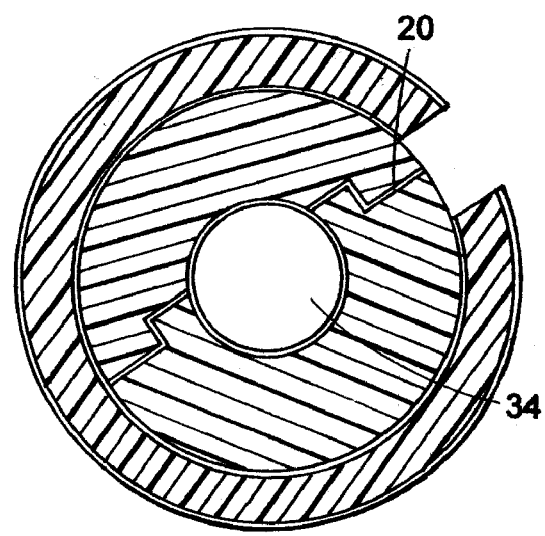
FIG. 10 is a transverse section taken on line 10-10 of the device of FIG. 9, showing the binding ring and the interlockingly-shaped connection edges.

Each section of the plurality of elongated sections 14 comprises an outer surface 16 (See FIG. 4), an inner surface 18 (See FIG. 4), also referred to as the "concave inner surface 18," a connection edge 20 (now referring back to FIG. 1), a thermometer insertion tip 22 of the section 14, and a distal tip 23 of the section 14. The outer surfaces 16 of each of the sections 14 jointly form the outside surface 17 of the case 10, when the case is assembled. Similarly, the concave inner surfaces 18 of each of the sections 14 jointly form the inside surface 19 (see FIG. 11) of the case 10, when the case is assembled. The term connection edge 20 refers to the peripheral surface of each of the sections 14, and is generally located between the outer surface 16 and the inner surface 18. When the case of the present invention is in assembled state, the connection edge 20 is locked in close proximity to, or in tight contact with, another connection edge 20, that of the neighboring section 14. In the preferred embodiment, such as that shown in FIG. 1, the connection edges 20 are generally flat. However, the connection edges do not have to be flat. For example, FIG. 10, shows interlockingly-shaped connection edges 20.

The thermometer insertion tip 22 of the section 14 refers to the tip of each of the sections 14 that, when the case 10 is being assembled, will (by junction with other thermometer insertion tips 22) form the insertion end 25 of the case 10. The thermometer insertion end 25 of the case 10 comprises an insertion aperture 27. The insertion aperture 27 is shaped and sized to accommodate the widest part of the thermometer to be protected by the case. If the thermometer to be protected is a meat thermometer, then usually only a thin metal probe needs to be protected, leaving the dial and the calibration mechanism of the thermometer to extend out of the case 10. Thus, the insertion aperture 27 of such a case would usually be small, slightly wider than the thin metal probe of the thermometer. Modern medical thermometers, on the other hand, have a much wider body than meat thermometers and usually have to be entirely fitted inside of the case. Thus, the insertion aperture 27 of the embodiment of case 10 designed to accommodate a medical thermometer, is much wider.

The distal tip 23 of the section 14 refers to the tip of each of the sections 14 that, when the case 10 is being assembled, will (by junction with other distal tips 23) form the distal end 30 in most embodiments of the case 10. The term "distal" refers to the side of the section 14 or case 10 that is opposite to the side having the insertion aperture 27. In the meat thermometer variation of the case 10, distal end 30 is usually the bottom side of the case, when the case is clipped to a shirt pocket. In medical thermometer variation of the case 10, the distal end 30 is usually the narrower side, containing the sensor of the thermometer. In the preferred embodiment of the invention, the distal end 30 comprises distal aperture 31. Distal aperture 31 may be used for improved air circulation inside the case, or to provide friction fit hold for the thermometer probe. In some embodiments of the case 10, the distal aperture 31 may be absent all together from the distal end.

Figure 3:
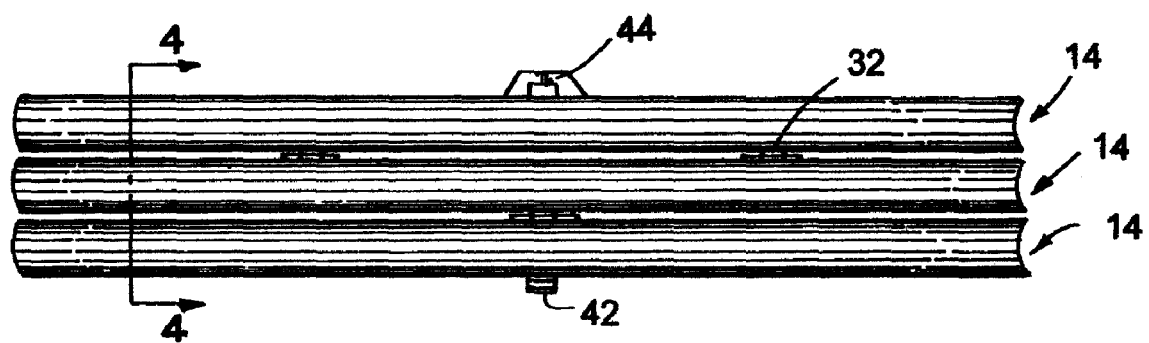
FIG. 3 is a side view of the embodiment of the thermometer storage case of the present invention that comprises more than two elongated sections.

In most embodiments of the case 10, the elongated sections 14 are each connected to at least one other adjacent section 14 by at least one hinge 32, which is also referred to as "hinge 32." The simplest example of this is illustrated on FIG. 1, where two sections 14 are each hingedly connected to each other on one side. FIG. 3, which shows three sections 14, illustrates how the section 14, located in the middle, can be hingedly connected to two other sections. The two other sections 14 on FIG. 3 are each only hingedly connected to one other section 14—the middle one.

The range of motion of each hinge is sufficiently wide to allow the elongated sections 14 to come tightly together, joining at connection edges 20. This coming together of sections 14 forms an assembled case body 50 of the case 10. The range of motion of each hinge 32 must also be sufficiently wide to allow the elongated sections to come apart far enough to allow for efficient inspection and cleaning of the inner surface by the user. In the preferred embodiment of the present invention, the hinge opens so far that all sections 14 lie in the same plane. That is, in the preferred embodiments, such as the one displayed on FIG. 1, the hinge has a range of motion of at least 180 degrees. However, much smaller ranges of motion, such as 45 degrees, may be sufficient for inspection and cleaning of the case 10 in alternative embodiments.

It should be noted that the term "hinge," as used in the claims and throughout this patent is a broad term, referring to all connections that can connect and allow some movement of sections 14 in reference to each other. In the preferred embodiment, shown on FIG. 1, the hinge 32, is a strip of flexible plastic, connecting two sections 14 together. Such hinge is also known as the "living hinge" or "flexure bearing."

The plastic comprising the hinge 32 may be the same plastic comprising the case body 50, only thinner, and thus more flexible. The use of the same plastic to manufacture the sections 14 and the hinge 32 makes manufacturing costs extremely low. The entire case 10 can be machine-molded in a single step by molding plastic sections 14, integrally connected by a thin plastic bridge (hinge 32).

The use of polypropylene is preferred in making the case 10 and the hinge 32 because of its excellent fatigue resistance, high melting point, and resistance to chemical reactions. The latter characteristic is particularly important for sanitizing the case with soaps and abrasive chemicals. However, other plastics, including anti-microbial plastics, as well as non-plastic materials may be used in the construction of all parts of the case 10.

Numerous types of hinges, other than living hinges, may be employed in embodiments of the case 10. For example, traditional pivot hinges, swiveling hinges, butt hinges, barrel hinges and many others, well known to those proficient in the art of hinges, are among those that may be used. Floating hinges may be successfully used in some embodiments of the present invention, allowing the movement of the sections 14 about the axis of the hinge, as well as away from each other (for inspection and cleaning).

The hinges are preferably, but not necessarily located along the long side of section 14. For example, as shown on FIG. 8, a hinge may connect the distal tips 23 of sections 14, forcing the case 10 to open like a flower, instead of like a clam-shell. That is, such hinge positioning makes the case open from top to bottom, instead of along the side. The hinges may be attached to the outer surface 16, the inner surface 18, or be concealed within the connection edge 20.

The case 10 of the present invention also anticipates the use of detachable hinges. That is, connectors that allow for complete detachment of connected sections 14. Such disassembly may be useful for better cleaning access or for use in the dishwasher.

When case 10 is in assembled state, with elongated sections 14 joined along the connection edges 20, the concave inner surfaces 18 form a bore 34. The bore 34 runs longitudinally through the case body, extending from the insertion aperture 27 to the distal aperture 31, in the preferred embodiment. In embodiments, where the distal aperture 31 is absent, the bore extends from the insertion aperture 27 to the distal end 30.

The bore 34 is generally shaped to accommodate the part of the thermometer that is to be protected by the case 10. That means that the bore 34 is generally cylindrical for accommodation of meat thermometers or generally follows the irregular shape of the thermometer for medical, digital or other non-cylindrical thermometers. In some embodiments, including the preferred embodiment, the width or diameter of the bore 34 only slightly exceeds the width or diameter of the thermometer to be protected, thus providing a secure friction fit for the thermometer. In other embodiments of the case, the bore 34 may be considerably wider than the width of the thermometer. In such embodiments, the inside surface of the case 10 comprises a plurality of holding members 36, also referred to as holding members 36. These holding members 36 extend perpendicularly from the inner surfaces of the elongated sections 14 into the bore and provide friction fit hold for the inserted thermometer. In the embodiments where holding members 36 are used, the inner surfaces 18 do not necessarily have to be concave or follow the shape of the thermometer, and can be straight, convex, or even irregular. Holding members 36, extending from any surface into the bore can provide secure friction hold for thermometer even if the inner surface 18 does not follow the shape of the thermometer. Similarly, the outer surface of case 10 can be of any convenient shape. In the preferred embodiments, however, the inner surfaces 18 are concave. The outer surface of the preferred embodiment of case 10 is generally convex and cylindrical.

The case 10 further comprises a fastener 38. This fastener 38 is capable of fixating the case in the assembled case body position. That is, once the sections 14 are folded together to form case body 50, the fastener 38 is utilized to prevent the case from unfolding or opening up. The term "fastener," as used here, is a broad term, which includes numerous types of locking, fastening, and connecting devices that can be used to detachably connect pieces of plastic, such as sections 14, together. In the simplest embodiment, the fastener 38 can be just a piece of string or a belt, that coils around the sections 14, is fixated by a knot or a buckle, and holds sections 14 assembled into case body 50. In the preferred embodiment, the fastener is a latch-and-catch type of device, wherein one part of the fastener—the latch 42 (see FIG. 3) is located on one section 14 and the other part—the catch 44 is located on the other section 14. In the preferred embodiment, the latch 42 and catch 44 of the fastener 38 are molded simultaneously with the rest of the case 10 and are made of the same material as the sections 14 and the hinge 32, to decrease costs of production.

Figure 8:
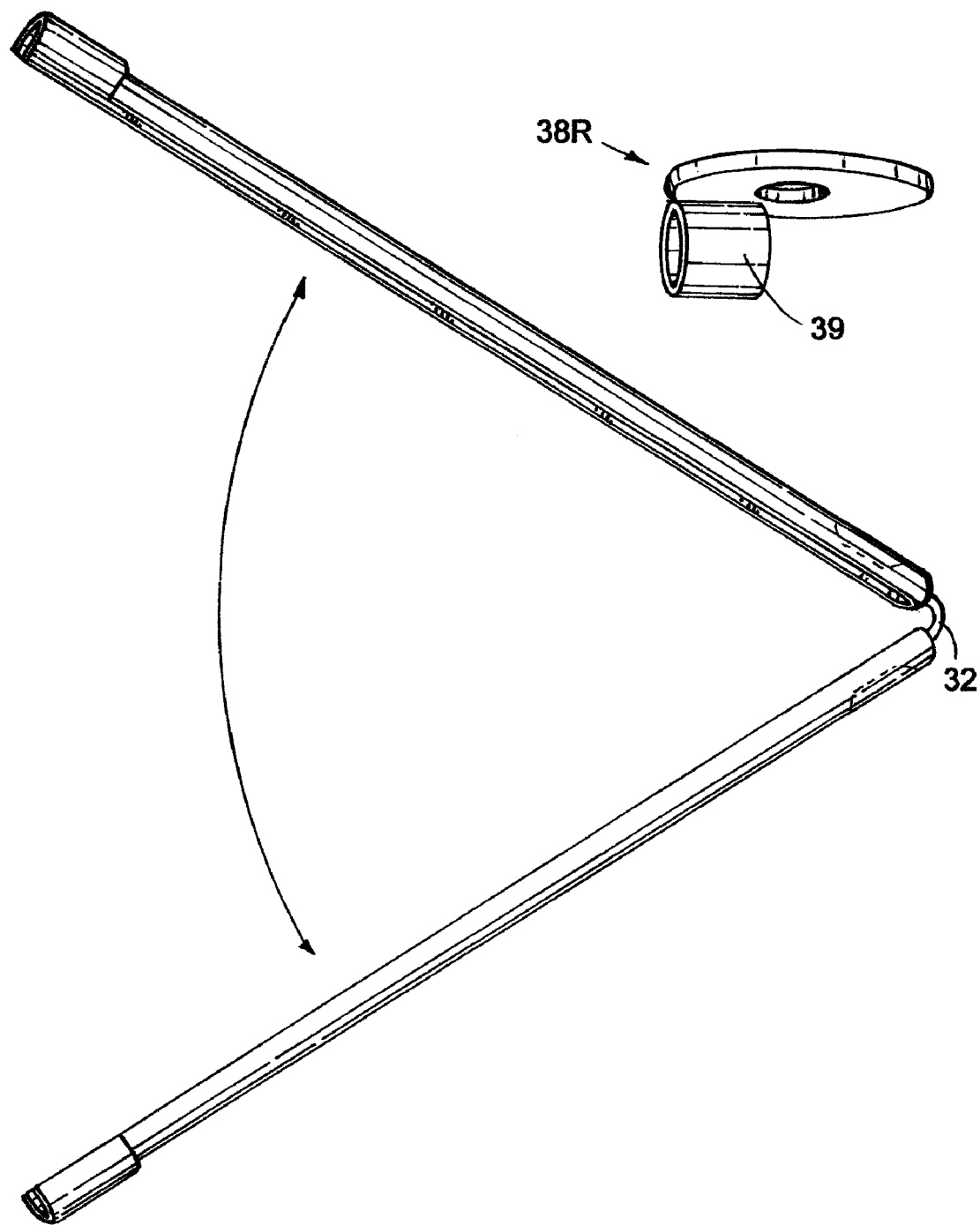
FIG. 8 is a side view of another preferred embodiment of the present invention, where the hinge connects the distal tips of elongated sections. The slip-on fastener, in the form of a binding ring connected to a pocket clip, is shown on the side.
Figure 9:
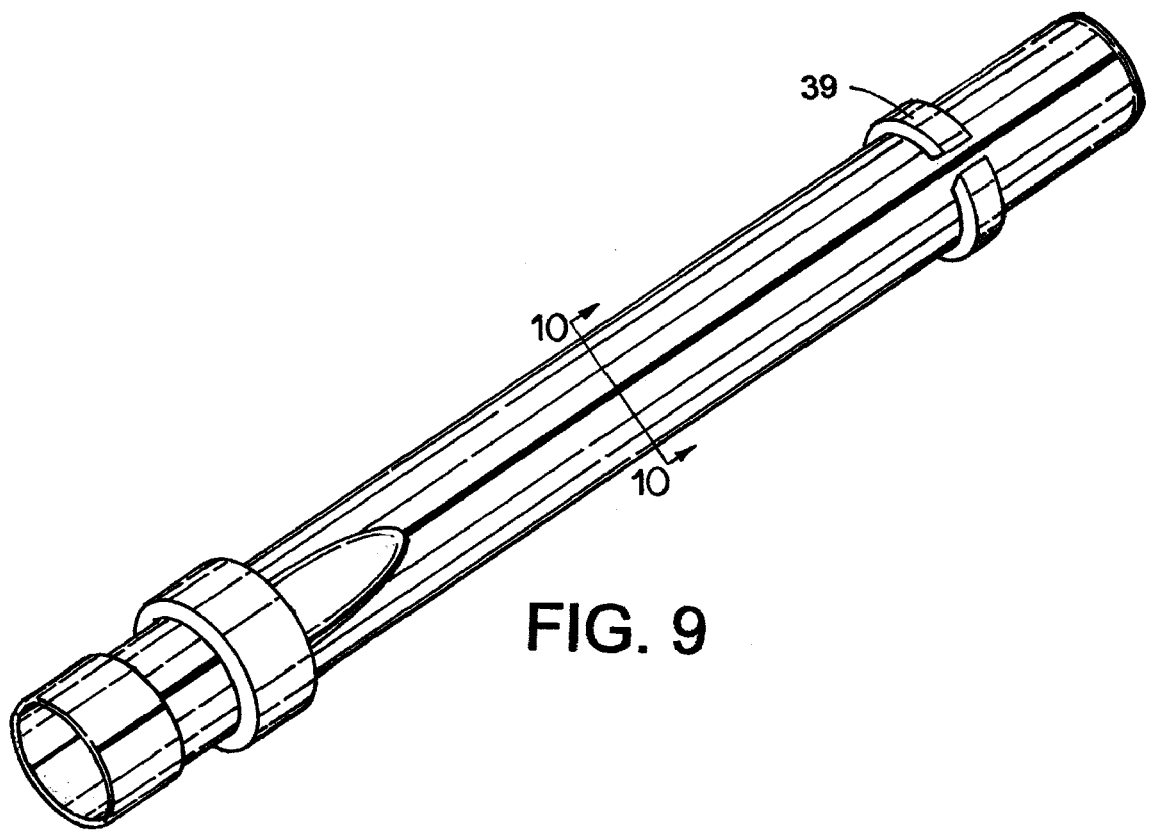
FIG. 9 is a perspective view of another embodiment of the present invention, where the elongated sections are held together by the binding rings (one of which comprises a pocket clip) and by the interlockingly-shaped connection edges.

In other preferred embodiments, illustrated on FIG. 8, FIG. 9, and FIG. 10, the fastener 38 comprises at least one, and preferably two, binding rings 39. Such fastener 38, comprising the binding rings 39 is marked as fastener 38R on the drawings. Binding rings 39 can be removably attached over the outer surfaces of the elongated sections 14. That is, the binding rings 39 are slipped or clipped over sections 14, encircling and holding the elongated sections 14 together, joined along the connection edge 20. The binding rings thus fixate the case in the assembled case body position. In FIG. 9, one of the rings is connected to the pocket clip. In the preferred embodiment shown on FIG. 9 and FIG. 10, the binding rings 39 do not extend the entire circumference of the case and are made of flexible plastic, which allows for clipping, as well as slipping the rings onto the sections 14. As an alternative to, or in addition to using the binding rings 39, a cap, similar to that used on drawing markers may be utilized to "cap" the distal end of the case body and thus hold sections 14 together. In other embodiments of case 10, various types of clasps, interlocking members, male and female members, snaps, magnets, or even friction hold adaptations, among others, may be utilized to act as the fastener 38. FIG. 10 illustrates the use of interlockingly-shaped connection edges 20, which are used along with the binding rings 39 to fixate the case 10 in the assembled case body position. Such interlockingly-shaped connection edges 20 may be used fixate the case, in conjunction with, or without the use of binding rings 39 or other fastening devices.

Figure 5:
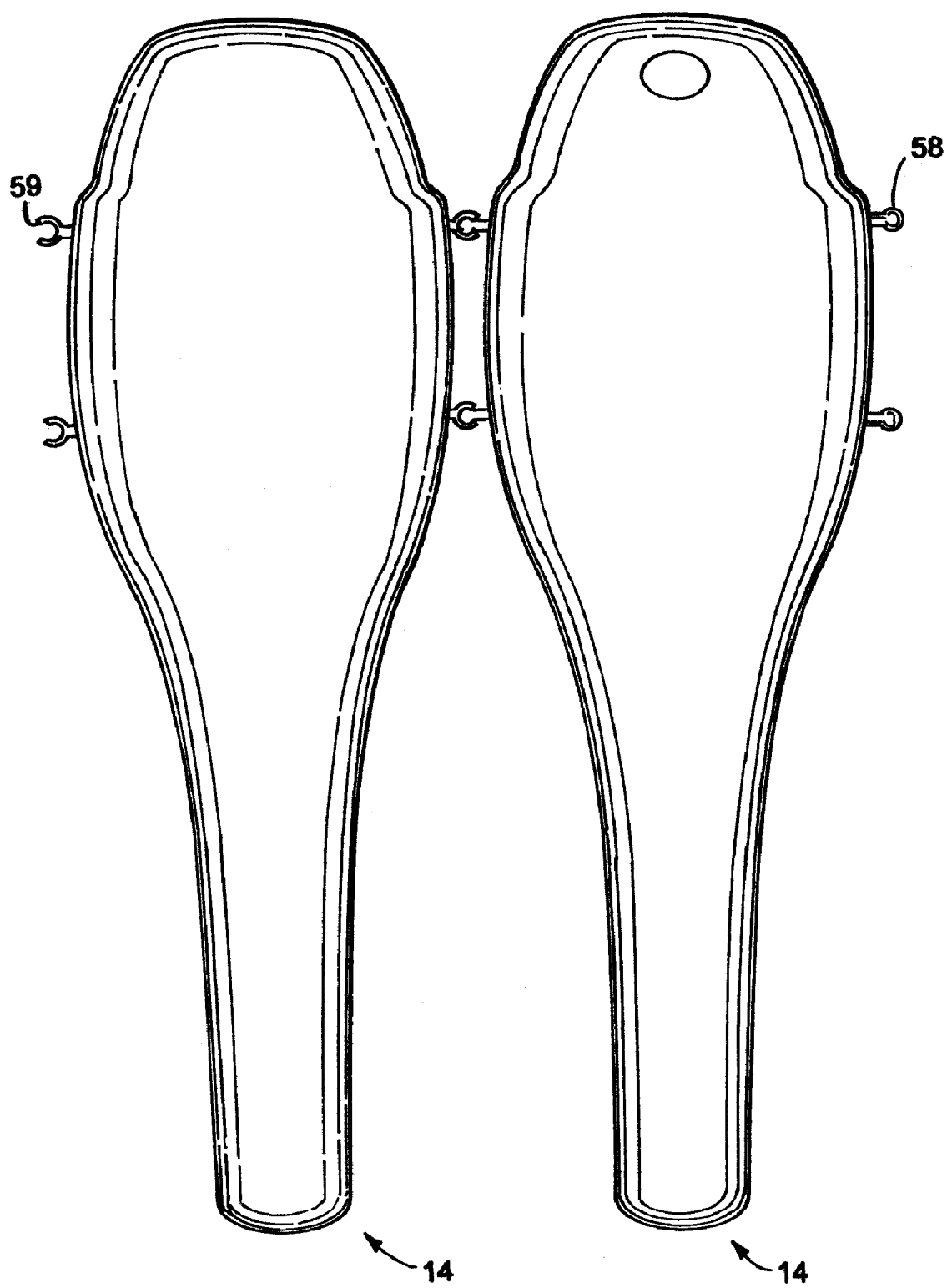
FIG. 5 is a top view of another embodiment of the present invention, intended for digital medical thermometer storage. The embodiment shown has disconnectable ball-and-socket hinges on both sides of the case body.
Figure 6:
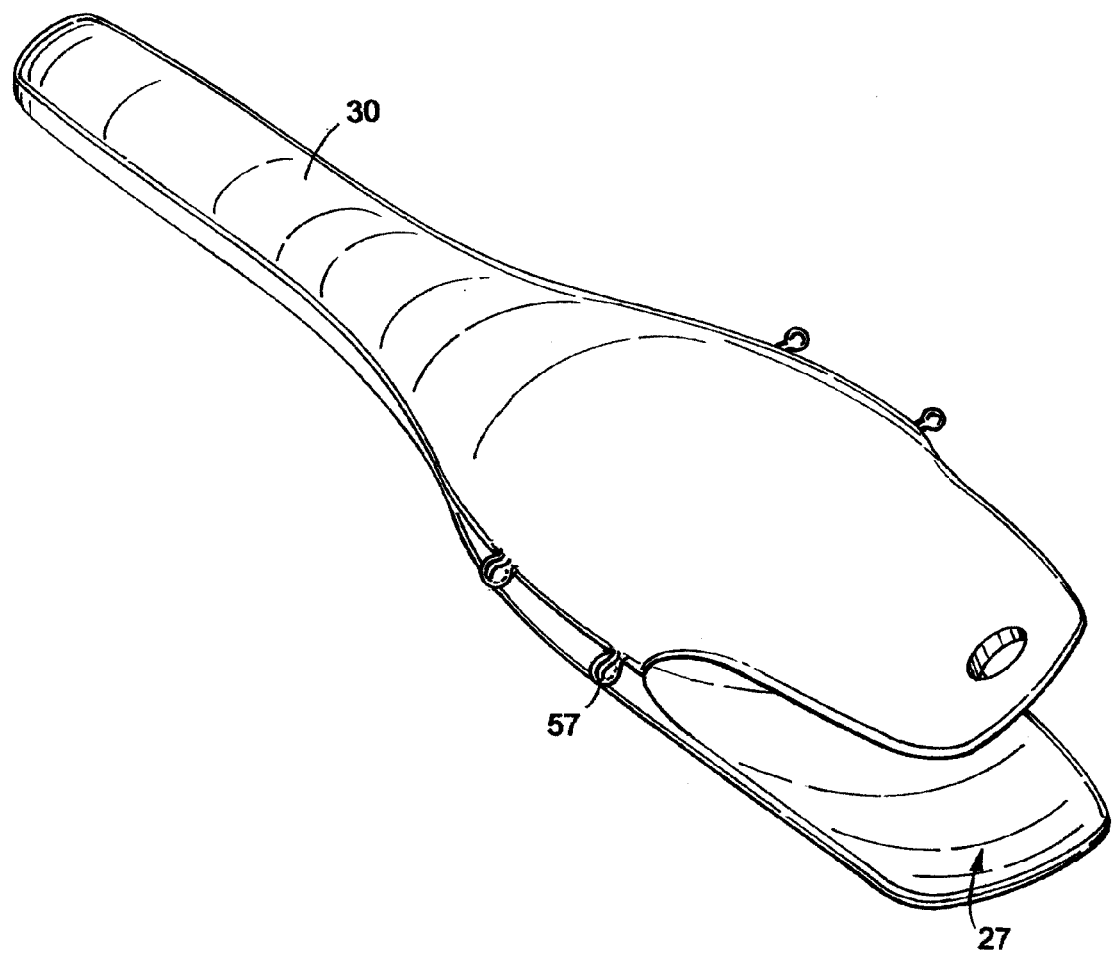
FIG. 6 is a perspective view of the embodiment of the case similar to that portrayed on FIG. 5, except showing a different type of disconnectable ball-and-socket hinges. The embodiment is shown in partially-opened position.
Figure 7:
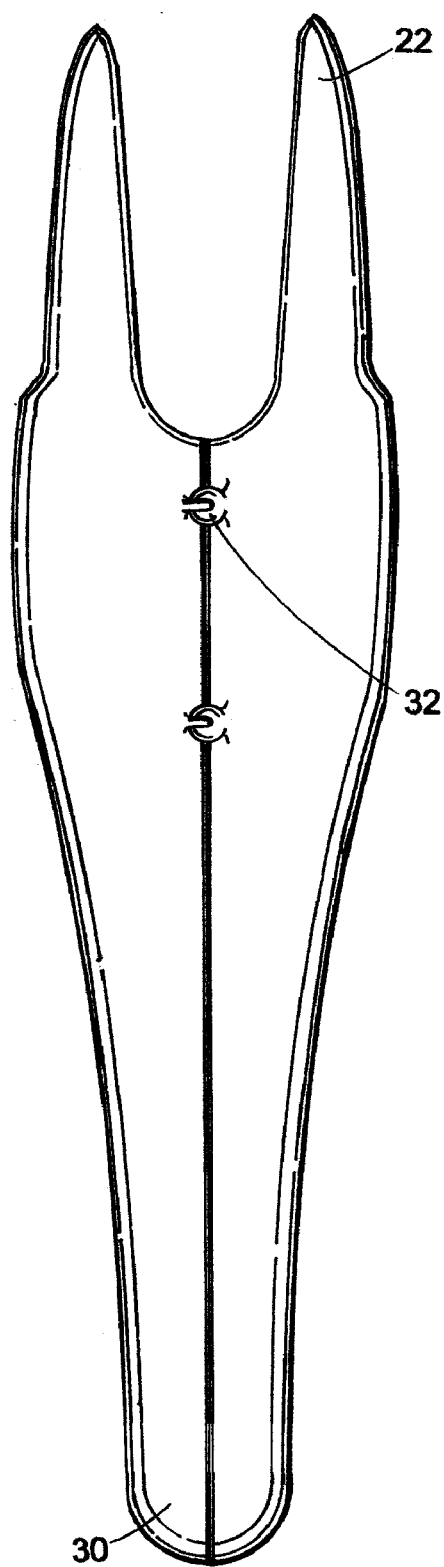
FIG. 7 is a side view the embodiment of the case similar to that portrayed on FIG. 5 and FIG. 6, except showing a different type of hinges.

In some embodiments, the hinge 32 can act as either the hinge or as the fastener 38, depending on circumstances. One example of this is possible with the hinge of the ball-and-socket type 57 (See FIG. 5) in which the ball 58 section is connected to one section 14 and the socket 59 section is connected to another section 14 and wherein the ball 58 section can be forcibly disconnected from the socket 59 section. Such a hinge acts as the hinge 32 by rotating, if the case is opened from the side opposite such a ball-and-socket device. Such a hinge may also function as a fastener 38 when it being forced apart (i.e. the ball is being pushed out of the socket) to open the case 10 from the side of the hinge, and then, when the ball is forced into the socket to assemble the case. In latter situation, the ball 58 and the socket 59 are acting as the kinds of the catch 44 and the latch 42. The use of such hinges that can also act as fasteners can allow for complete disassembly of the case 10 or for opening of the case from any side for better inspection and cleaning. Other types of latch-and-catch and other connectors/fasteners can be located on both sides of the case and simultaneously act as hinges (See FIG. 6 and FIG. 7) and are well known to those skilled in the art of hinges and connectors.

Figure 11:
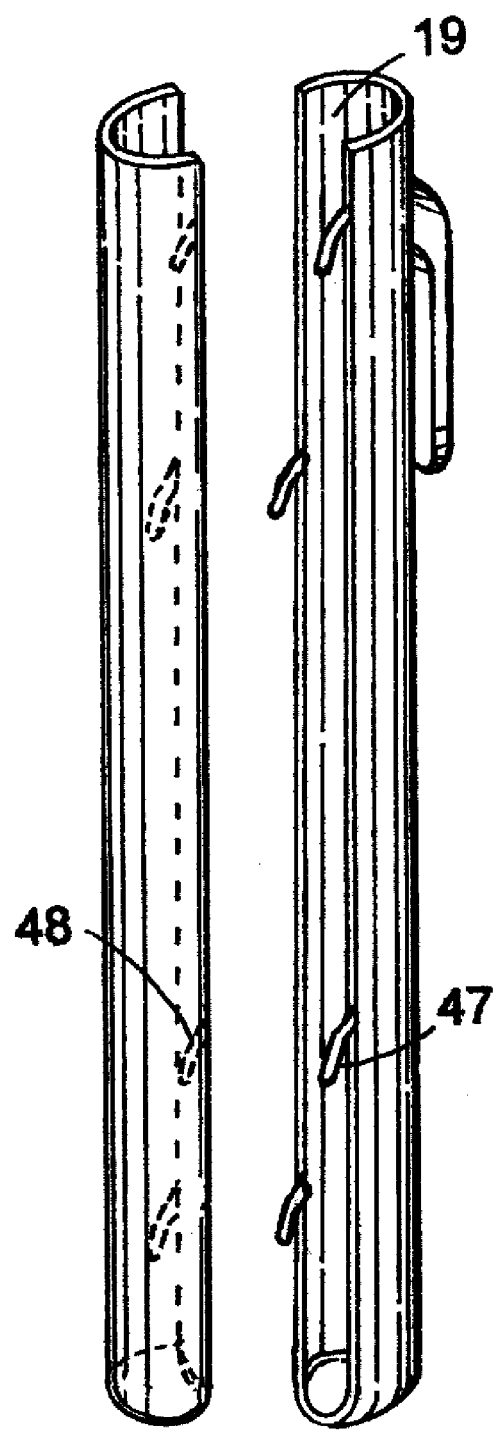
FIG. 11 is a side view of one of the embodiments of the present invention, where the fastener comprises male members and female members. The embodiment is shown in disassembled case body position.

Some other embodiments of the present invention, such as the embodiment displayed on FIG. 11, are also designed to be completely disassembleable and to open up without any hinges. That is, the sections 14 are each disconnectably attached along the connection edge to at least one other elongated section 14. When such a connection is disconnected, the sections 14 completely separate from each other, for better inspection and cleaning. One variation of the fastener 38 for such an embodiment comprises at least two male members 47, and at least two female members 48. The male members 47 extend perpendicularly out of the connection edge 20, and the female members 48 extend perpendicularly into the connection edge 20. The male members 47 and the female members 48 are arranged on two opposing sections 14 in such a way that each male member 47 is directly opposite one of the female members 48. When two sections 14 are connected to each other, each male member 47 inserts into the corresponding female member 48. Each male member 47 may be secured inside of the female member 48 either by corresponding interlocking notches on male and female members or by the force of friction, thus fixating the case in the assembled case body position.

Alternatively, two sections 14 of the disassembleable embodiment of the present invention can be securable by a fastener that comprises a lug and a groove. In such embodiments, the groove is positioned on the different and opposite elongated section 14 from the lug. The lug slides into the groove, thus connecting the elongated sections 14 together and fixating the case in the assembled case body position. There is also a number of other varieties of fasteners, including the binding rings 39, described above, and others, well known to those skilled in the art, which can hold two sections 14 disconnectably attached.

In the preferred embodiments of the present invention, all of the sections 14 are of the same or very similar size and shape. However, in alternative embodiments, the size and shape of sections 14 within the case 10 may vary. For example, some sections 14 may be narrower than others. Some may be shorter than others, as long as the sections complement each other, fitting together as pieces of the puzzle, to form a complete case body 50, when joined together.

Similarly, although the connection edge 20 is smooth and/or interlockingly-shaped in some embodiments, in other embodiments of the invention, the connection edge 20 may be in the shape of a zigzag. In such embodiments, the connection edge 20 of the adjacent section 14 is also zigzag-shaped, so that two connection edges fit together like pieces of the puzzle. Zigzag shape or some other unusual shape of the connection edge 20 may be preferable in some embodiments of the case 10 for preventing botulism poisonings, as explained below.

In some embodiments of the present invention, the connection edges can be made very smooth, and even fit into each other, so that the seal between the adjacent connection edges 20 is very tight, preventing any air from entering the case through the connection. However, in the preferred embodiment, microscopic slits and holes remain along the connection when elongated sections 14 come tightly together at connection edges 20, thus allowing air to enter the case 10. This air, entering through the slits ventilates the case and the inserted thermometer along the entire length, thus preventing the growth of deadly anaerobic bacteria, such as *Clostridium botulinum*—the cause of botulism. In the preferred embodiments, the slits and holes between the connection edges 20 remain microscopic or very small to prevent external contaminants, such as dust from entering the case. However, the amount of air entering and ventilating the case 10 can be increased by increasing the number of holes and slits along the connection edges 20. One way to do it is by making the surface of the connection edge rougher. The other way, is by increasing the surface area of the connection edges 20. The surface area of the connection edges 20 can be increased by the use of zigzag-shaped connections. The overall surface area of the connection edges 20 can also be increased by using more than two sections 14 in construction of the case 10.

When the case 10 is assembled and the fastener 38 holds the sections together, the case 10 has the shape of, and can be used like any other, elongated end-loading open-end thermometer storage case. The thermometer can be easily slipped in and out of the case of the present invention without the need to open the fastener or any other part of the case. Additional adaptations can be removably or integrally attached to the case body 50, as is customary with end-loading, open-end thermometer storage cases. For example, a pocket clip or thermometer calibration devices may be attached to the case body 50 for user's convenience.

However, in contrast to the prior art cases, when contamination is suspected, or at some regular maintenance period, such as at the end of each cooking day, the case 10 can be quickly and easily opened for inspection and cleaning. In some embodiments of the present invention, the case 10, or at least some of the longitudinal sections 14 are made of transparent plastic to assist the user in timely identification of any internal contamination of the case 10. Whenever contamination is spotted or suspected, the user of the case just needs to unfasten the fastener 38 and open, unfold, or disassemble the case 10 by pulling the sections 14 away from each other. The inside surface of the case 10 can then be inspected for traces of contamination. Inspecting the inside surface of the case 10 may involve looking for decaying matter and any unusual discolorations that may be indicative of contamination, looking for any deep scratches, where bacteria may reside, and touching the inside surface to determine any unusual stickiness or slipperiness, indicative of contamination. The inside surface of the case 10 can then be easily sanitized to any extent the user feels comfortable with. The case is then reassembled, ready for use. In most cases, a simple scrub of the surface with soap and hot water is sufficient to render the case clean and to restore the confidence of the cook in the safety of his tool.

While the apparatus and method of this invention have been described and illustrated in detail, the above-described embodiments are simply illustrative of the principles of the invention. Various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

I claim:

1. An elongated open-insertion-end end-loading storage case for thermometers, comprising:
   A. a plurality of elongated sections, each section of the plurality of elongated sections comprising:
   an outer surface, an inner surface, a connection edge, a thermometer insertion tip of the section, and a distal tip of the section;
   B. wherein said elongated sections are each connected to at least one other adjacent elongated section by at least one hinge;
   C. wherein the range of motion of each hinge of the at least one hinge is sufficiently wide to allow the elongated sections to come tightly together at connection edges, thereby forming an assembled case body,
   wherein the range of motion of each hinge of the at least one hinge is also sufficiently wide to allow the elongated sections to come apart far enough to allow for efficient inspection and cleaning of the inner surface by the user;
   said case body further comprising:
   i. an insertion end of the case body,
   ii. a distal end of the case body,
   iii. a bore, extending longitudinally through the case body and exiting at the insertion end of the case body, the bore being formed by the inner surfaces of the elongated sections;
   iv. an insertion aperture, located at the insertion end of the case body, said insertion aperture formed by exiting of the bore at the insertion end of the case body; said insertion aperture being of sufficient diameter to allow at least part of the thermometer to fit therethrough;
   D. wherein, the case further comprises a fastener, the fastener capable of fixating the case in the assembled case body position, and wherein the insertion aperture stays open for accepting a thermometer, when the case is fixated in the assembled case body position, and wherein the inner surfaces of the elongated sections are shaped to generally conform to the thermometer, when the case is fixated in the assembled case body position.

2. The case of claim 1, wherein the plurality of elongated sections exceeds two elongated sections.

3. The case of claim 1, wherein the at least one hinge and the elongated sections is made of polypropylene.

4. The case of claim 1, wherein at least one of the plurality of the elongated sections is made of transparent plastic.

5. The case of claim 1, wherein the range of motion of the hinge is at least 180 degrees.

6. The case of claim 1, wherein a plurality of holding members extends perpendicularly into the bore from the inner surfaces of the elongated sections, said holding members intended to provide secure friction fit hold for the inserted thermometer.

7. The case of claim 1, wherein the surfaces of the connection edges are rough, so that some microscopic air passages remain between the elongated sections, even when the elongated sections come tightly together at the connection edges, said air passages intended to inhibit the growth of anaerobic bacteria inside the case.

8. The case of claim 1, wherein the distal tips of the sections form a distal end of the case body when the case body is assembled, and likewise, the thermometer insertion tips of the sections form a thermometer insertion end of the case body when the case body is assembled.

9. The case of claim 8, wherein the hinge is disassembleable, meaning that the hinge can be taken apart into two or more parts, thus allowing for total disconnection of the elongated sections from each other, for inspection and/or cleaning.

10. The case of claim 8, wherein the inner surface of the elongated sections is concave.

11. The case of claim 8, wherein the case body further comprises a distal aperture, located at the distal end of the case body.

12. The case of claim 1, wherein the plurality of elongated sections is limited to only two elongated sections.

13. The case of claim 12, wherein the outer surface of the case is cylindrical.

14. The case of claim 12, wherein the at least one hinge is made of flexible plastic.

15. The case of claim 14, wherein the at least one hinge is the living hinge, meaning that the hinge itself has no moving parts and bends and/or flexes to allow movement of the elongated sections in relation to each other.

16. A disassembleable elongated open-end end-loading storage case for thermometers, comprising:

A. a plurality of elongated sections, wherein each section of the plurality of elongated sections comprises an outer surface, an inner surface, a connection edge, a thermometer insertion tip of the section, and a distal tip of the section;

B. wherein said elongated sections are each disconnectably attached along the connection edge to at least one other elongated section, thereby forming an assembled case body;

said case body further comprising:

I. an insertion end of the case body;

ii. a distal end of the case body;

iii. a bore, extending longitudinally through the case body and exiting at the insertion end of the case body, the bore being formed by the inner surfaces of the elongated sections;

iv. an insertion aperture, located at the insertion end of the case body; said insertion aperture formed by exiting of the bore at the insertion end of the case body; said insertion aperture being of sufficient diameter to allow at least part of the thermometer to fit therethrough, and having a diameter larger than a diameter of an aperture located at the distal end of the case body;

C. the case further comprising a fastener, the fastener capable of fixating the case in the assembled case body position.

17. The case of claim 16, wherein the fastener comprises at least one male member, and at least one female member, wherein said at least one male member fixates inside of the at least one female member to fixate the case in the assembled body position.

18. The case of claim 16, wherein the fastener comprises a lug and a groove, wherein the groove is positioned on the different elongated section from the lug, and wherein the lug slides into the groove positioned on the different elongated section, thus connecting the elongated sections together and fixating the case in the assembled case body position.

19. The case of claim 16, wherein the fastener fixates the case in the assembled case body position by utilizing the force of friction.

20. The case of claim 16, wherein the fastener comprises at least one binding ring removably attached over the outer surfaces of the elongated sections, thus holding the elongated sections together, connected along the connection edges, thereby fixating the case in the assembled case body position.

* * * * *